(12) United States Patent
Jeon et al.

(10) Patent No.: US 11,449,644 B2
(45) Date of Patent: Sep. 20, 2022

(54) ELECTRONIC DEVICE OPERATING ENCRYPTION FOR USER DATA

(71) Applicant: Samsung Electronics Co., Ltd., Suwon-si (KR)

(72) Inventors: Byungjoon Jeon, Suwon-si (KR); Gimin Kim, Suwon-si (KR); Kihyung Kim, Suwon-si (KR); Jinho Kim, Suwon-si (KR); Isaac Lee, Suwon-si (KR); Jaehoon Jung, Suwon-si (KR); Hyungchul Jung, Suwon-si (KR); Nohik Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 16/947,550

(22) Filed: Aug. 6, 2020

(65) Prior Publication Data
US 2021/0042448 A1    Feb. 11, 2021

(30) Foreign Application Priority Data
Aug. 7, 2019    (KR) ........................ 10-2019-0096266

(51) Int. Cl.
*G06F 11/30*    (2006.01)
*G06F 21/79*    (2013.01)
(Continued)

(52) U.S. Cl.
CPC .......... *G06F 21/79* (2013.01); *G06F 11/0772* (2013.01); *G06F 11/1451* (2013.01);
(Continued)

(58) Field of Classification Search
CPC ............ G06F 11/0772; G06F 11/1451; G06F 11/1469; G06F 21/602; G06F 21/64; G06F 21/79; G06F 2221/0755
See application file for complete search history.

(56) References Cited

U.S. PATENT DOCUMENTS 7,240,219 B2    7/2007    Teicher et al.
7,900,061 B2    3/2011    Teicher et al.
(Continued)

FOREIGN PATENT DOCUMENTS

CN    101986596 A    3/2011
JP    2014089640 A    5/2014
(Continued)

OTHER PUBLICATIONS

International Search Report and Written Opinion of the International Searching Authority in connection with International Application No. PCT/KR2020/010308 dated Nov. 27, 2020, 10 pages.
(Continued)

*Primary Examiner* — Gary S Gracia

(57) ABSTRACT

An electronic device includes a memory and a processor. The memory includes a data partition, a key storage partition, and a key backup partition. The processor operatively connected to the memory. The processor is configured to generate an encryption key with respect to at least one data folder generated in the data partition to store the encryption key in the key storage partition. The processor is also configured to store a backup encryption key equal to the encryption key, in the key backup partition. The processor is further configured to store an integrity file including a checksum of the encryption key in the key backup partition.

19 Claims, 16 Drawing Sheets

(51) Int. Cl.
  *G06F 21/60* (2013.01)
  *G06F 21/64* (2013.01)
  *G06F 11/14* (2006.01)
  *G06F 11/07* (2006.01)
  *G06F 12/14* (2006.01)

(52) U.S. Cl.
  CPC ........ *G06F 11/1469* (2013.01); *G06F 21/602* (2013.01); *G06F 21/64* (2013.01); *G06F 2221/0755* (2013.01)

(56) References Cited

U.S. PATENT DOCUMENTS

| | | | | |
|---|---|---|---|---|
| 8,468,244 | B2* | 6/2013 | Redlich | G06Q 10/06 715/255 |
| 8,588,425 | B1* | 11/2013 | Harwood | G06F 12/1408 380/278 |
| 8,782,441 | B1* | 7/2014 | Osterwalder | G06F 21/6218 713/193 |
| 9,280,671 | B2 | 3/2016 | Endo et al. | |
| 9,571,278 | B1 | 2/2017 | Harwood et al. | |
| 10,110,382 | B1* | 10/2018 | Roth | H04L 9/0894 |
| 10,585,762 | B2 | 3/2020 | Sankar et al. | |
| 10,628,333 | B2 | 4/2020 | Kakutani | |
| 2002/0042884 | A1* | 4/2002 | Wu | H04L 63/123 726/10 |
| 2004/0236958 | A1* | 11/2004 | Teicher | G06F 21/6218 713/193 |
| 2007/0177740 | A1* | 8/2007 | Nakajima | G06F 21/6218 380/277 |
| 2008/0077808 | A1* | 3/2008 | Teicher | G06F 21/6218 713/193 |
| 2008/0219449 | A1* | 9/2008 | Ball | G06F 21/80 380/277 |
| 2010/0088525 | A1* | 4/2010 | Ureche | G06F 21/72 713/193 |
| 2012/0151223 | A1* | 6/2012 | Conde Marques | G06F 21/6218 713/193 |
| 2012/0324242 | A1* | 12/2012 | Kirsch | G06Q 20/38215 713/189 |
| 2013/0304761 | A1 | 11/2013 | Redlich et al. | |
| 2014/0105390 | A1* | 4/2014 | Chen | H04W 12/02 380/200 |
| 2014/0122903 | A1* | 5/2014 | Endo | G06F 21/602 713/193 |
| 2014/0289539 | A1 | 9/2014 | Osterwalder et al. | |
| 2015/0127658 | A1* | 5/2015 | Ding | G06F 16/2255 707/747 |
| 2016/0140057 | A1 | 5/2016 | Endo et al. | |
| 2017/0220426 | A1* | 8/2017 | Sankar | G06F 16/2365 |
| 2017/0286527 | A1* | 10/2017 | Li | G06F 3/0604 |
| 2018/0039582 | A1* | 2/2018 | Kakutani | H04L 9/0897 |
| 2019/0108009 | A1* | 4/2019 | Haase | G06F 3/0673 |
| 2019/0196919 | A1 | 6/2019 | Sankar et al. | |
| 2019/0311336 | A1* | 10/2019 | Kim | G06Q 20/065 |
| 2019/0370013 | A1* | 12/2019 | Katchapalayam | G06F 21/6218 |

FOREIGN PATENT DOCUMENTS

| | | |
|---|---|---|
| JP | 2018022985 A | 2/2018 |
| KR | 10-2005-0119283 A | 12/2005 |
| KR | 10-2009-0042706 A | 4/2009 |
| KR | 10-2014-0071775 A | 6/2014 |

OTHER PUBLICATIONS

European Patent Office, "Supplementary European Search Report" dated Jul. 6, 2022, in connection with European Patent Application No. 20849570.5, 7 pages.

* cited by examiner

ELECTRONIC DEVICE OPERATING ENCRYPTION FOR USER DATA

CROSS-REFERENCE TO RELATED APPLICATION

This application is based on and claims priority under 35 U.S.C. § 119 to Korean Patent Application No. 10-2019-0096266, filed on Aug. 7, 2019, in the Korean Intellectual Property Office, the disclosure of which is incorporated by reference herein its entirety.

BACKGROUND

1. Field

The disclosure relates to an encryption technology used in an electronic device.

2. Description of Related Art

Electronic devices such as a smartphone have been used to be closely related to users. As electronic devices personally employed by users have been widely distributed and used, personal information or user-related information of users stored in the electronic devices has been also increasing. Accordingly, an encryption technology is being used to protect data recorded and stored in an electronic device from hacking.

The above information is presented as background information only to assist with an understanding of the disclosure. No determination has been made, and no assertion is made, as to whether any of the above might be applicable as prior art with regard to the disclosure.

SUMMARY

An electronic device may divide and manage the data partition (e.g., /data) into a plurality of regions (or folders) (e.g., non-encrypted (NE), global device encrypted (DE), user DE, credential encrypted (user CE)). The conventional electronic device has generated an encryption key for each of the plurality of region, and has stored the generated encryption key together with user data in a data partition. However, the user data in the data partition may be frequently input and output, and thus the encryption key is also likely to be corrupted when there is a problem in the data partition. Besides, when the encryption key is changed by changing the user data, the overwriting of the encryption key may fail due to the corruption of the data partition. All user data encrypted with the encryption key may not be used when the encryption key is corrupted. In the meantime, the conventional recovery method is copying and recovering the user data itself backed up by a user's selection or storing the checksum for the user data, identifying the integrity of the user data itself, and recovering the user data for each user data file, not recovering the encryption key. Accordingly, it may take a lot of time to recover the user data.

Aspects of the disclosure are to address at least the above-mentioned problems and/or disadvantages and to provide at least the advantages described below. Accordingly, an aspect of the disclosure is to provide an electronic device that stores encryption keys corresponding to a plurality of regions included in a data partition in a key storage partition different from the data partition.

Furthermore, an aspect of the disclosure is to provide an electronic device that backs up encryption keys stored in a key storage partition in a key backup partition and stores an integrity file obtained by re-encrypting the encryption keys in the key backup partition.

Besides, an aspect of the disclosure is to provide an electronic device that may use a backup encryption key stored in the key backup partition when failing to load an encryption key due to a file system error.

Also, an aspect of the disclosure is to provide an electronic device that may use a backup encryption key stored in a key backup partition when the region where the encryption key of a memory is stored is damaged physically.

In accordance with an aspect of the disclosure, an electronic device may include a memory in which a region is divided by a data partition, a key storage partition, and a key backup partition and a processor operatively connected to the memory. The processor may be configured to generate an encryption key with respect to at least one data folder generated in the data partition to store the encryption key in the key storage partition, to store a backup encryption key equal to the encryption key, in the key backup partition, and to store an integrity file including a checksum of the encryption key in the key backup partition.

In accordance with another aspect of the disclosure, an electronic device may include a memory in which a region is divided by a data partition, a key storage partition, and a key backup partition and a processor operatively connected to the memory. The data partition may include a first data folder in which files associated with driving of the electronic device are stored and a second data folder in which files associated with a user are stored. The processor may be configured, at a first boot time, to generate a first encryption key corresponding to the first data folder to store the first encryption key in a first key storage folder of the key storage partition, to store a first integrity file including a checksum calculated based on the first encryption key, in a first key backup folder of the key backup partition, at the first boot time or when users are switched, to generate a second encryption key corresponding to the second data folder to store the second encryption key in a second key storage folder of the key storage partition, and to store a second integrity file including a checksum calculated based on the second encryption key, in a second key backup folder of the key backup partition.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
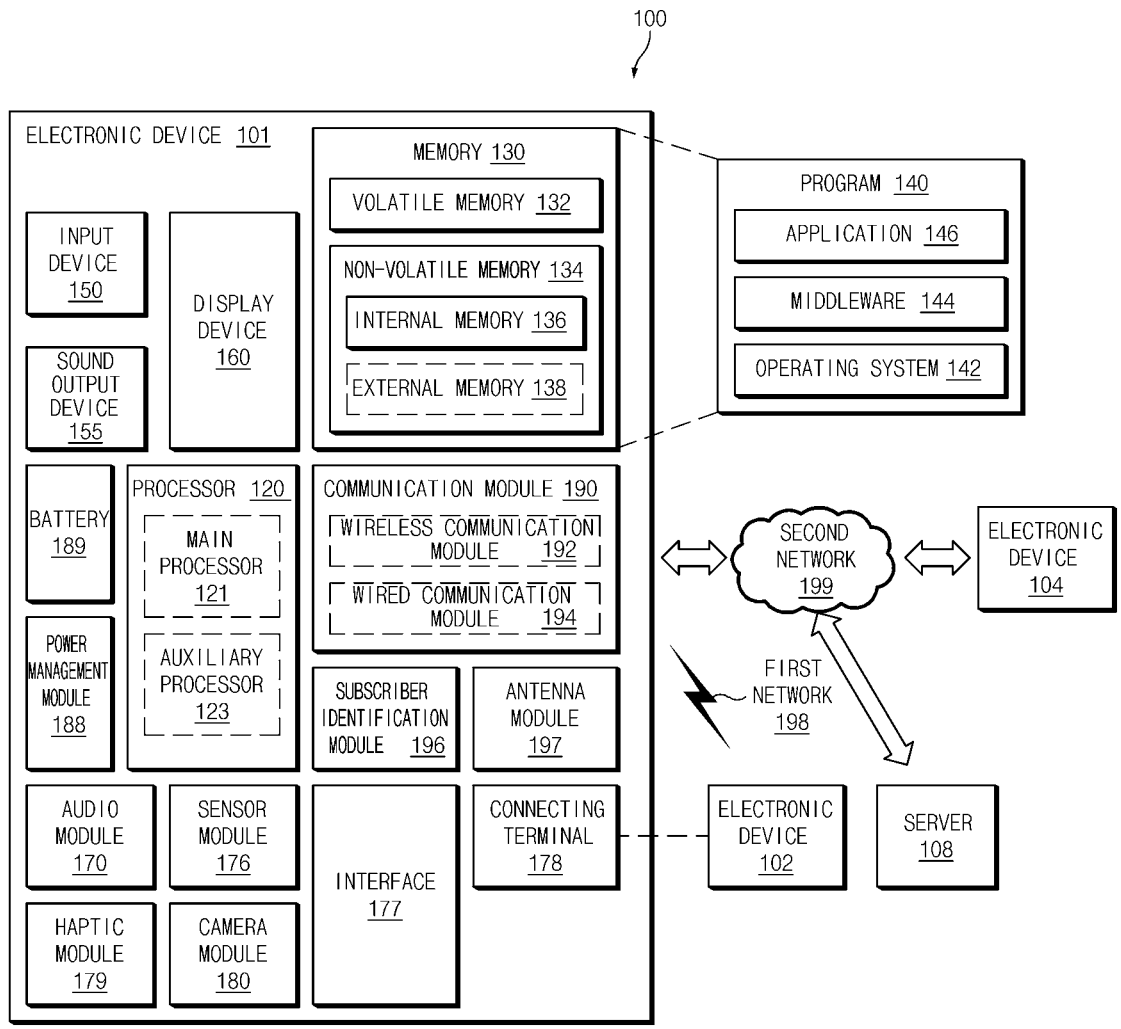
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
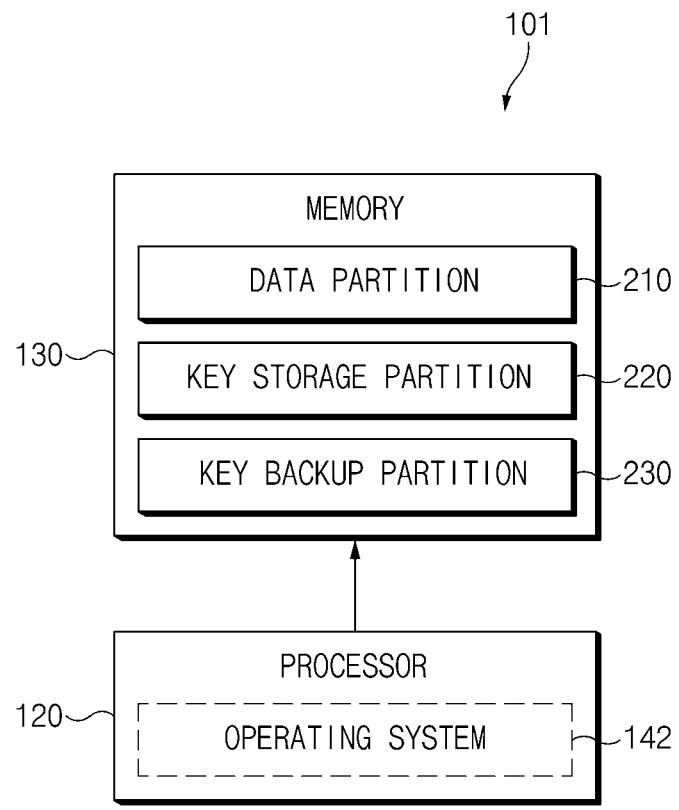
FIG. 2A is a diagram illustrating a configuration of partitions included in a memory of an electronic device according to an embodiment.
Figure 2B:
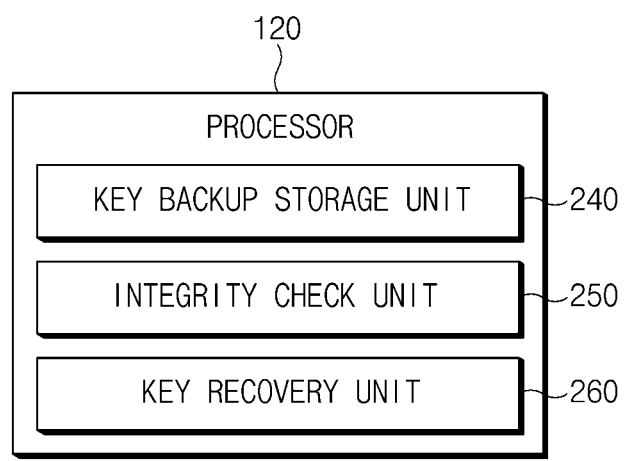
FIG. 2B is a diagram illustrating components included in a processor of an electronic device according to an embodiment.
Figure 3:
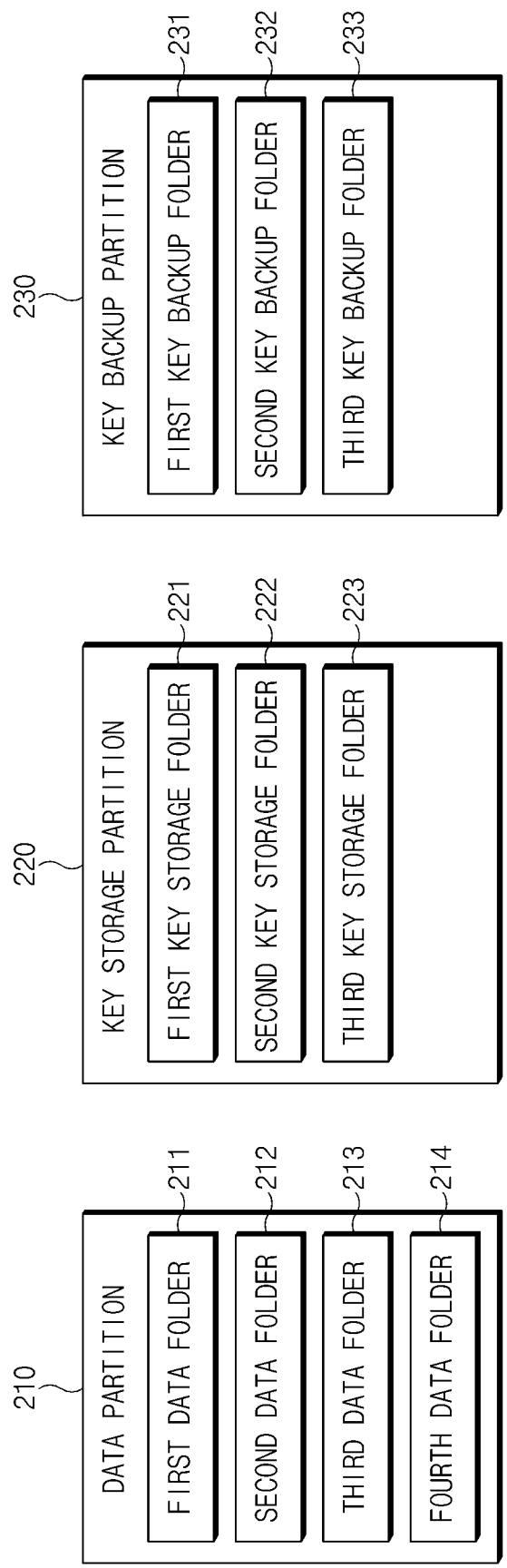
FIG. 3 is a diagram illustrating an example of folders included in partitions of FIG. 2A.
Figure 4:
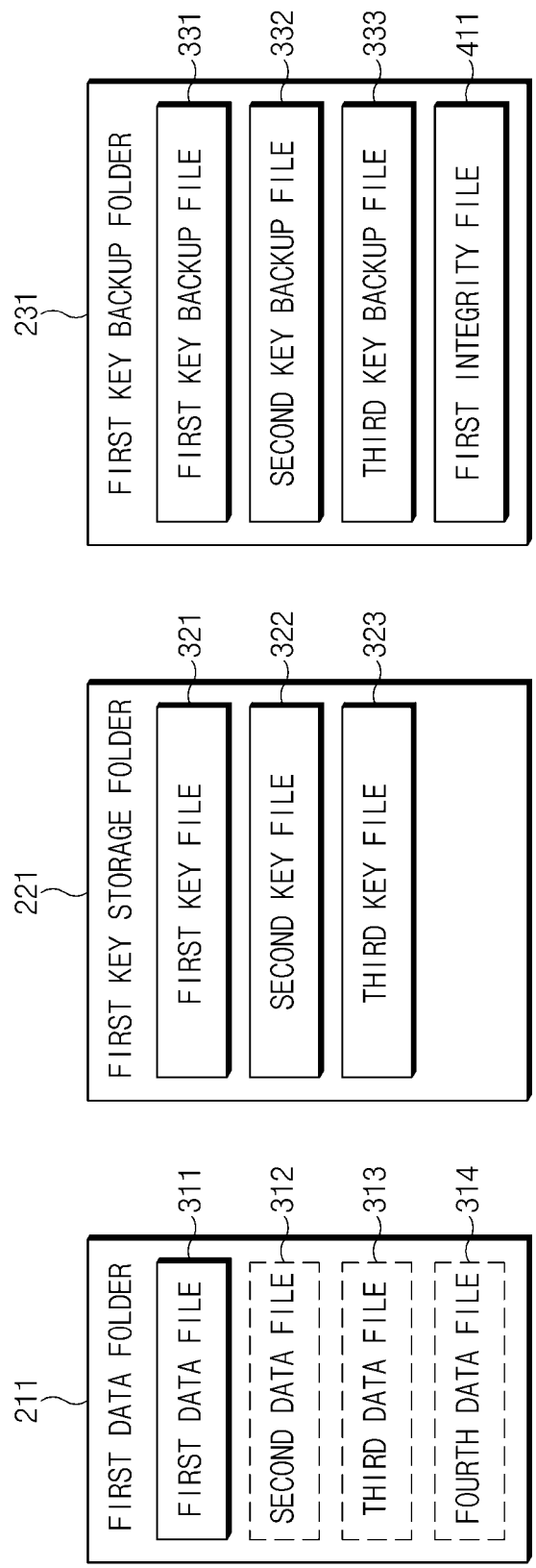
FIG. 4 is a diagram illustrating an example of files included in a first key storage folder and a first key backup folder corresponding to the first data folder of FIG. 3.
Figure 5A:
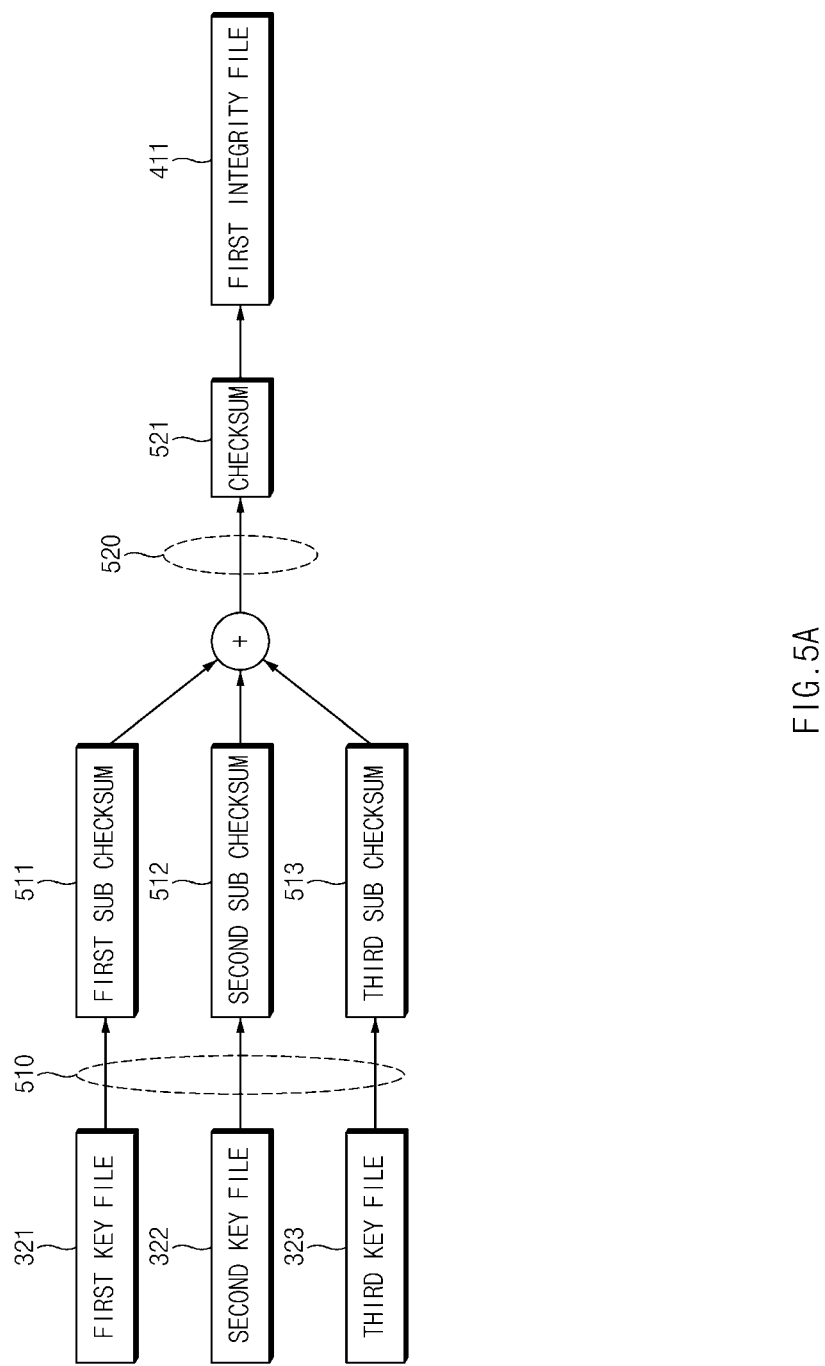
FIG. 5A is a diagram illustrating an example of a process in which the first integrity file of FIG. 4 is generated.
Figure 5B:
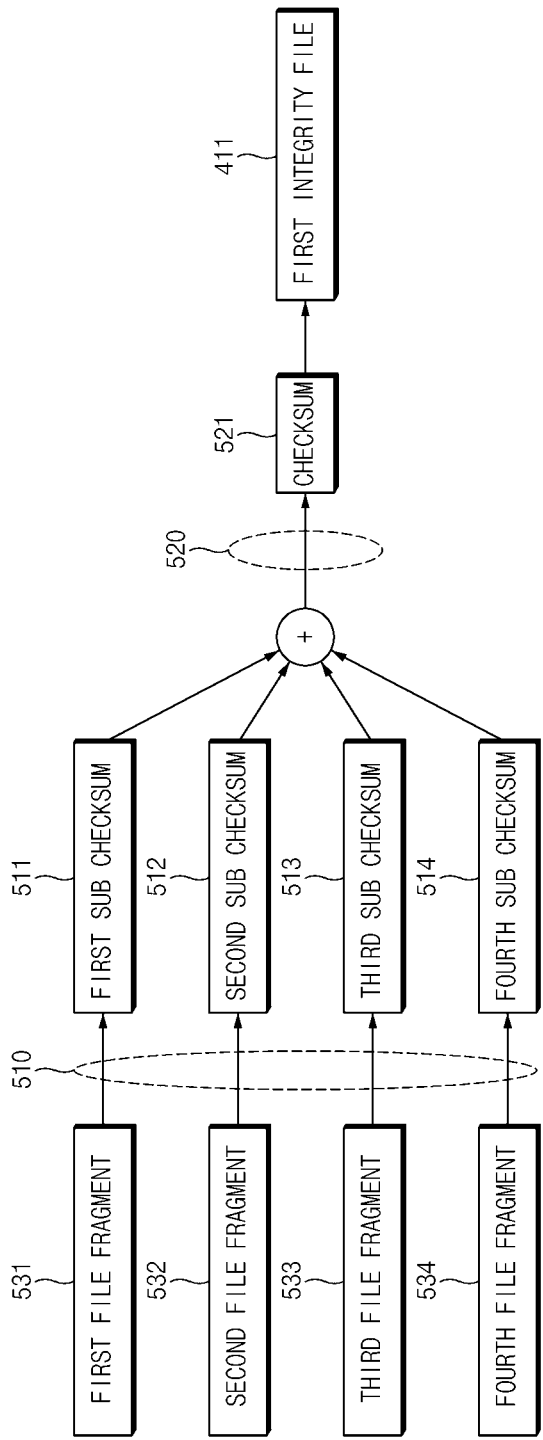
FIG. 5B is a diagram illustrating another example of a process in which the first integrity file of FIG. 4 is generated.

FIG. 2A is a diagram illustrating a configuration of partitions included in a memory of an electronic device according to an embodiment. FIG. 2B is a diagram illustrating components included in a processor of an electronic device according to an embodiment. FIG. 3 is a diagram illustrating an example of folders included in partitions of FIG. 2A. FIG. 4 is a diagram illustrating an example of files included in a first key storage folder and a first key backup folder corresponding to the first data folder of FIG. 3. FIG. 5A is a diagram illustrating an example of a process in which the first integrity file of FIG. 4 is generated. FIG. 5B is a diagram illustrating another example of a process in which the first integrity file of FIG. 4 is generated.

Referring to FIGS. 2A to 5B, the memory 130 may include a data partition 210 (e.g., /data) for storing user data, a key storage partition 220 (e.g., /keydata) for storing an encryption key corresponding to the user data, and a key backup partition 230 (e.g., /keyrefuge) for storing a backup encryption key by backing up the encryption key. For example, the processor 120 (e.g., the processor 120) of the electronic device 101 (e.g., the electronic device 101) may load the operating system 142 (e.g., the operating system 142) at boot time. The processor 120 may generate the data partition 210, the key storage partition 220, and the key backup partition 230 in the memory 130 through the operating system 142 at the first boot time (e.g., the first use of an electronic device after user purchase or the first boot after the initialization of the electronic device). A series of operations associated with partitions, folders, and files described later may be performed through the operating system 142 executed by the processor 120.

According to an embodiment, a plurality of folders (or folder group) (e.g., non-encrypted (NE), global device encrypted (DE), user DE, credential encrypted (user CE)) may be generated in the data partition 210. For example, first to fourth data folders 211, 212, 213, and 214 may be generated in the data partition 210. For example, the first to third data folders 211, 212, and 213 may be managed by encryption, and the fourth data folder 214 (e.g., NE) may be managed without encryption. However, the number of data folders included in the data partition 210 is not limited thereto. The number of data folders included in the data partition 210 is exemplary, and the data partition 210 may include at least one data folder.

According to an embodiment, files associated with the operation of the electronic device may be stored in the first data folder 211 (e.g., global DE). Files associated with user information may be stored in second and third data folders 212 and 213. Files (e.g., images, videos, or documents) stored by the user may be stored in the second data folder 212 (e.g., user DE). Files associated with user security (e.g., credential file (e.g., pin, pattern, or lock)) may be stored in the third data folder 213 (e.g., user CE). According to various embodiments, when the electronic device is used by a plurality of users, the second and third data folders 212 and 213 may be generated for each user. For example, the second and third data folders 212 and 213 respectively corresponding to a plurality of users (e.g., a first user and a second user) such as the first user's DE folder, the first user's CE folder, the second user's DE folder, and the second user's CE folder may be generated in the data partition 210. In various embodiments, the third data folder 213 may be generated as a sub-folder of the second data folder 212.

According to an embodiment, first to third key storage folders 221, 222, and 223 corresponding to the first to third data folders 211, 212, and 213 may be generated in the key storage partition 220. For example, a first encryption key corresponding to at least one file stored in the first data folder 211 may be stored in the first key storage folder 221. The first encryption key may include key files (e.g., version, rot, keymaster_key_blob, or encrypted_key). The second encryption key corresponding to at least one file stored in the second data folder 212 may be stored in the second key storage folder 222. The second encryption key may include key files (e.g., version, keymaster_key_blob, or encrypted_key). The third encryption key corresponding to at least one file stored in the third data folder 213 may be stored in the third key storage folder 223. The third encryption key may include key files (e.g., version, salt, keymaster_key_blob, or encrypted_key).

According to an embodiment, first to third key backup folders 231, 232, and 233 corresponding to the first to third key storage folders 221, 222, and 223 may be generated in the key backup partition 230. For example, the first backup encryption key the same as the first encryption key stored in the first key storage folder 221 may be stored in the first key backup folder 231. The first backup encryption key may include the same key files (e.g., version, rot, keymaster_key_blob, or encrypted_key) as the first encryption key. The second backup encryption key the same as the second encryption key stored in the second key storage folder 222 may be stored in the second key backup folder 232. The second backup encryption key may include the same key files (e.g., version, keymaster_key_blob, or encrypted_key) as the second encryption key. The third backup encryption key the same as the third encryption key stored in the third key storage folder 223 may be stored in the third key backup folder 233. The third backup encryption key may include the same key files (e.g., version, salt, keymaster_key_blob, or encrypted_key) as the third encryption key. In various embodiments, the first integrity file 411 including the checksum of the first encryption key may be stored in the first key backup folder 231. A second integrity file including the checksum of the second encryption key may be stored in the second key backup folder 232. A third integrity file including the checksum of the third encryption key may be stored in the third key backup folder 233.

Referring to FIG. 4, as an embodiment, at least one data file may be stored in the first data folder 211. For example, a single data file (e.g., a first data file 311) may be stored in the first data folder 211. Alternatively, a plurality of data files (e.g., first to fourth data files 311, 312, 313, and 314) may be stored in the first data folder 211. The first encryption key (e.g., first to third key files 321, 322, and 323) stored in the first key storage folder 221 may be generated based on data files (e.g., at least one of the first to fourth data files 311, 312, 313, and 314) stored in the first data folder 211. The same first backup encryption key (e.g., first to third key backup files 331, 332, and 333) as the first encryption key may be backed up and stored in the first key backup folder 231. Besides, the first integrity file 411 including the checksum of the first encryption key may be stored in the first key backup folder 231. In various embodiments, the second encryption key or the third encryption key stored in the second key storage folder 222 or the third key storage folder 223 may be generated and stored in the manner the same as or similar to the first encryption key stored in the first key storage folder 221. Furthermore, the second backup encryption key or the third backup encryption key stored in the second key backup folder 232 or the third key backup folder 233 may be generated and stored in the manner the same as or similar to the first backup encryption key stored in the first key backup folder 231. In various embodiments, the first encryption key may include the first to third key files 321, 322, and 323. However, this is exemplary, and the number of key files included in the first encryption key is not limited thereto. The first encryption key may include at least one key file. In various embodiments, the number or content of key files included in the first encryption key may be the same or different from the number or content of key files included in the second encryption key or the third encryption key.

According to an embodiment, the first integrity file 411 may be generated by re-encrypting the first encryption key (e.g., the first to third key files 321, 322, and 323). For example, referring to FIG. 5A, the processor 120 of the electronic device 101 may calculate checksums (e.g., first to third sub checksums 511, 512, and 513) of the respective first to third key files 321, 322, and 323 (e.g., a first encryption operation 510). The processor 120 may calculate a checksum 521 of the first to third sub checksums 511, 512, and 513 (e.g., a second encryption operation 520). The processor 120 may store the first integrity file 411 including the checksum 521 in the first key backup folder 231 of the key backup partition 230. For example, the first encryption operation 510 and the second encryption operation 520 may be implemented using an encryption hash function (e.g., the secure hash algorithm) or various encryption algorithms (e.g., Merkle tree). In various embodiments, the second integrity file stored in the second key backup folder 232 or the third integrity file stored in the third key backup folder 233 may be generated in the manner the same as or similar to the first integrity file 411.

According to various embodiments, sub checksums may be generated in units of file fragments, not file units. For example, referring to FIG. 5B, the processor 120 of the electronic device 101 may divide the first to third key files 321, 322, and 323 into file fragments (e.g., first to fourth file fragments 531, 532, 533, and 534) of a specified size (e.g., 4 KB). The processor 120 may calculate checksums (e.g., the first to fourth sub checksums 511, 512, 513, and 514) based on the first to fourth file fragments 531, 532, 533, and 534 (e.g., the first encryption operation 510). The processor 120 may calculate the checksum 521 of the first to fourth sub checksums 511, 512, 513, and 514 (e.g., the second encryption operation 520).

According to various embodiments, the processor 120 of the electronic device 101 may include a key backup storage unit 240, an integrity check unit 250, and a key recovery unit 260. For example, referring to FIG. 2B, the key backup storage unit 240, the integrity check unit 250, and the key recovery unit 260 may be implemented with hardware in a part of the processor 120. Alternatively, the key backup storage unit 240, the integrity check unit 250, and the key recovery unit 260 may be stored in the memory 130 as software; the processor 120 may execute the key backup storage unit 240, the integrity check unit 250, and the key recovery unit 260. Alternatively, the key backup storage unit 240, the integrity check unit 250, and the key recovery unit 260 may be implemented with the combination of hardware and software. The processor 120 may perform the operations of FIGS. 6 to 14 described below through the key backup storage unit 240, the integrity check unit 250, and the key recovery unit 260.

According to various embodiments, the key backup storage unit 240 may back up the encryption key stored in the key storage partition 220 in the key backup partition 230. For example, in an operation of satisfying the specified conditions (e.g., at the first boot time, when a new user is registered, or when the content of a data folder is changed), the key backup storage unit 240 may generate a new encryption key and may store the encryption key generated in the key storage partition 220. For example, the key backup storage unit 240 may generate a first encryption key (e.g., the first to third key files 321, 322, and 323) corresponding to the first data folder 211 and may store the first encryption key in the first key storage folder 221. Likewise, the key backup storage unit 240 may generate a second encryption key corresponding to the second data folder 212 to store the second encryption key in the second key storage folder 222 and may generate a third encryption key corresponding to the third data folder 213 to store the third encryption key in the third key storage folder 223.

In addition, as an embodiment, the key backup storage unit 240 may back up the encryption key stored in the key storage partition 220 in the key backup partition 230. For example, the key backup storage unit 240 may store the first backup encryption key (e.g., the first to third key backup files 331, 332, and 333), which is the same as the first encryption key, in the first key backup folder 231. Likewise, the key backup storage unit 240 may store the second backup encryption key, which is the same as the second encryption key, in the second key backup folder 232 and may store the third backup encryption key, which is the same as the third encryption key, in the third key backup folder 233.

Furthermore, in an embodiment, the key backup storage unit 240 may generate an integrity file corresponding to the encryption key and may store the integrity file in the key backup partition 230. For example, the key backup storage unit 240 may generate the first integrity file 411 based on the first encryption key (e.g., the first to third key files 321, 322, and 323). For example, using the method of FIG. 5A, the key backup storage unit 240 may calculate the sub checksums 511, 512, and 513 of the respective first to third key files 321, 322, and 323 and may calculate the checksum 521 of the sub checksums 511, 512, and 513 again to generate the first integrity file 411 including the checksum 521. Alternatively, using the method of FIG. 5B, the key backup storage unit 240 may calculate the sub checksums 511, 512, 513, and 514 of the respective first to fourth file fragments 531, 532, 533, and 534 obtained by dividing the first to third key files 321, 322, and 323 into a specified size (e.g., 4 KB) and may calculate the checksum 521 of the sub checksums 511, 512, 513, and 514 again to generate the first integrity file 411 including the checksum 521. The key backup storage unit 240 may store the generated first integrity file 411 together with the first to third key backup files 331, 332, and 333 in the first key backup folder 231. Likewise, the key backup storage unit 240 may store the second integrity file generated based on the second encryption key in the second key backup folder 232 and may store the third integrity file generated based on the third encryption key in the third key backup folder 233.

According to various embodiments, when a specified condition occurs (e.g., the decryption error of one of the first to third data folders 211, 212, and 213), the integrity check unit 250 may determine whether the encryption key is recoverable, by determining the integrity of the encryption key or the backup encryption key. For example, the processor 120 may decrypt the first data folder 211 to read out data (e.g., files) stored in the first data folder 211, using the first encryption key (hereinafter a first current encryption key) stored in the first key storage folder 221 during a specified operation (e.g., at boot time). At this time, when the decryption error of the first data folder 211 occurs, the integrity check unit 250 may determine whether the first current encryption key is corrupted, using the first integrity file 411 stored in the first key backup folder 231. The method of determining whether the first current encryption key is corrupted will be described in detail in FIG. 11 to be described later. When the first current encryption key is normal, the processor 120 may perform the decryption operation of the first data folder 211 again. When the first current encryption key is corrupted, the integrity check unit 250 may determine whether the first current encryption key is recoverable, using the first backup encryption key and the first integrity file 411 that are stored in the first key backup folder 231. A method of determining whether the first current encryption key is recoverable will be described in detail in FIG. 12 described later. Likewise, the integrity check unit 250 may determine whether the second encryption key or the third encryption key is corrupted or recoverable, during a specified operation (e.g., at boot time or when users are switched).

According to various embodiments, when the recovery of the current encryption key is possible, the key recovery unit 260 may recover the current encryption key. For example, the key recovery unit 260 may replace the current encryption key (e.g., the first encryption key stored in the first key storage folder 221, the second encryption key stored in the second key storage folder 222, or the third encryption key stored in third key storage folder 223) stored in the key storage partition 220 with a backup encryption key (e.g., the first backup encryption key stored in the first key backup folder 231, the second backup encryption key stored in the second key backup folder 232, or the third backup encryption key stored in the third key backup folder 233) stored in the key backup partition 230. For example, the key recovery unit 260 may delete the first encryption key from the first key storage folder 221 and may store the first backup encryption key in the first key storage folder 221. The key recovery unit 260 may delete the second encryption key from the second key storage folder 222 and may store the second backup encryption key in the second key storage folder 222. The key recovery unit 260 may delete the third encryption key from the third key storage folder 223 and may store the third backup encryption key in the third key storage folder 223.

As described above, the processor 120 may store the encryption key (e.g., the first encryption key, the second encryption key, or the third encryption key) corresponding to the data folder (e.g., the first to third data folders 211, 212, and 213) in the key storage folder (e.g., the first to third key storage folders 221, 222, and 223) of the key storage partition 220 that is a region separated from the data partition 210. Accordingly, the corruption of the encryption key due to the frequent input/output of the data folder may be prevented. In various embodiments, the processor 120 may store a backup (e.g., a backup encryption key) of the encryption key in the key backup partition 230 that is a region separated from the key storage partition 220. Furthermore, the processor 120 may store the integrity file, which is obtained by encrypting the encryption key in duplicate, in the key backup partition 230. The processor 120 may determine whether the encryption key is corrupted and recoverable, using an integrity file and then may perform self-recover on the encryption key, using a backup encryption key. When self-recovery is capable of being normally performed on the encryption key, the data folder may be decrypted normally through the recovered encryption key, thereby preventing the loss of user data.

Figure 6:
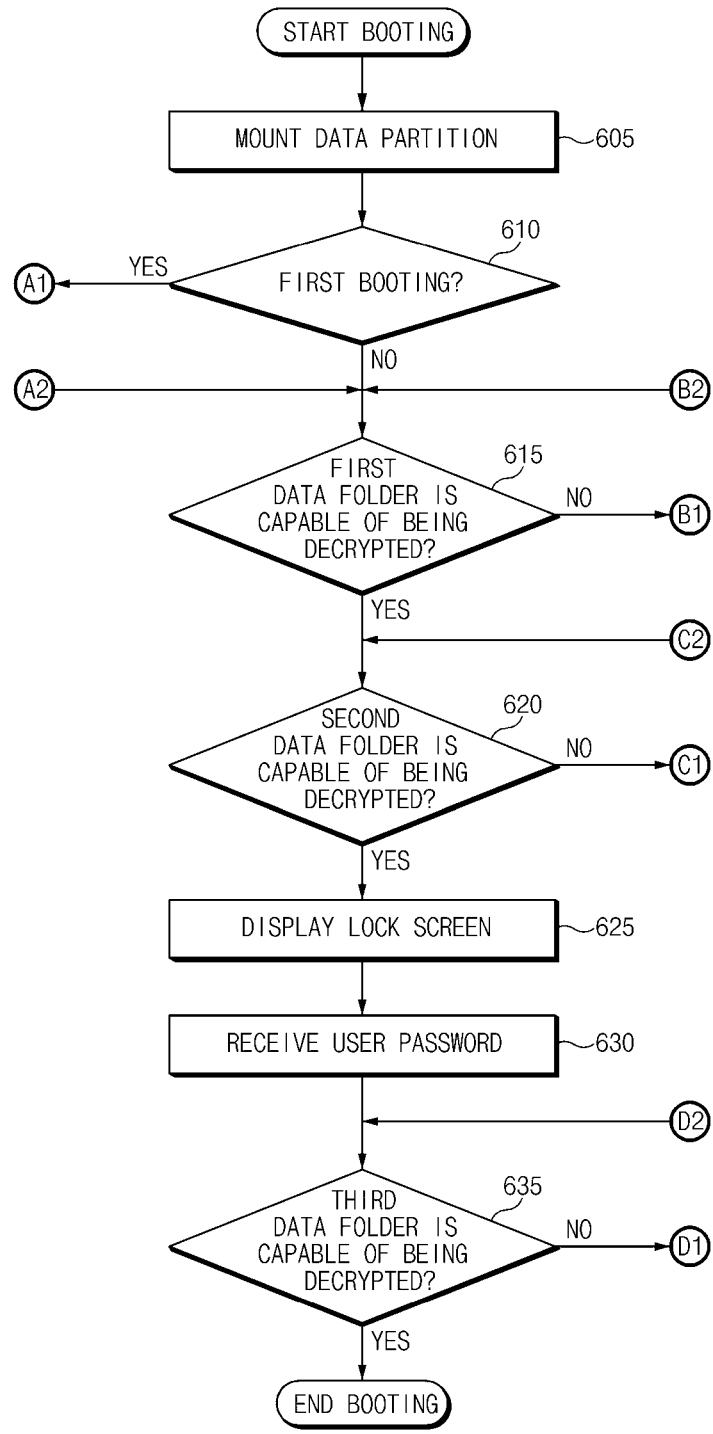
FIG. 6 is a flowchart illustrating a boot operation of an electronic device according to an embodiment.
Figure 7:
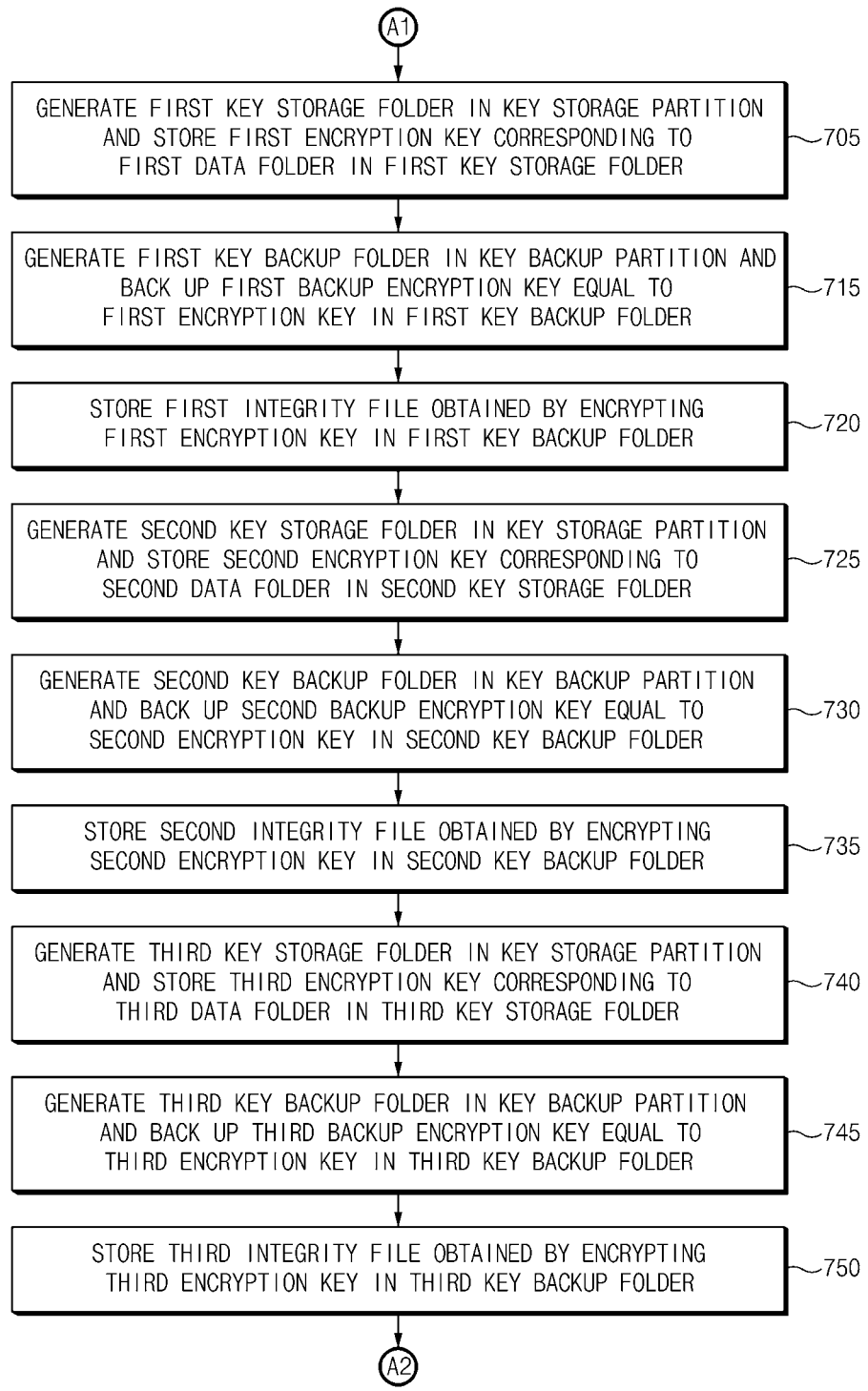
FIG. 7 is a flowchart illustrating an example of an operation of generating a key storage folder and a key backup folder corresponding to A1 and A2 of FIG. 6.
Figure 8:
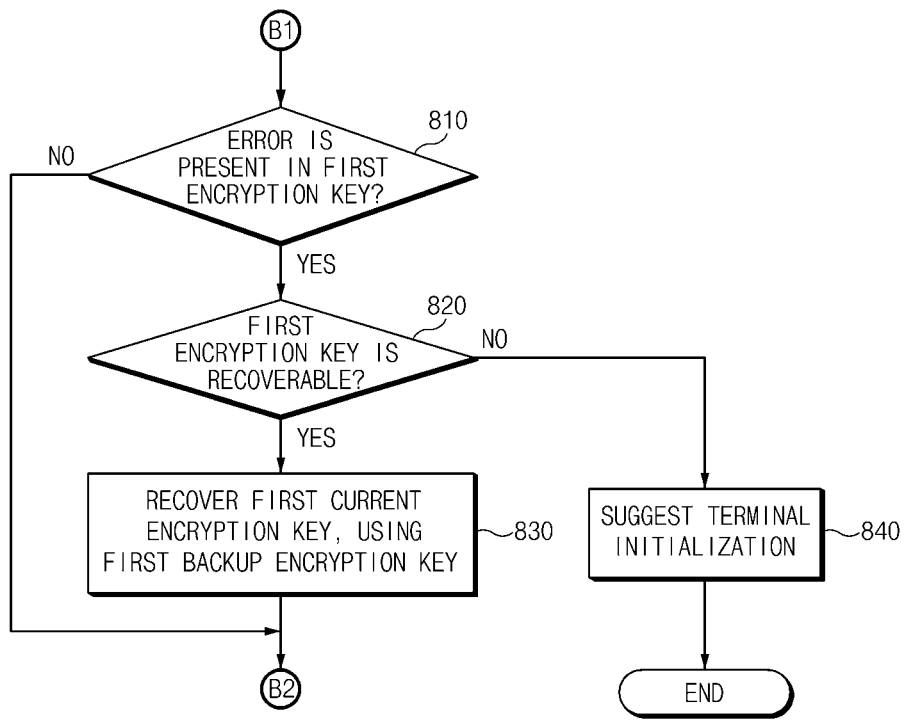
FIG. 8 is a flowchart illustrating an example of an integrity verification operation of a first encryption key corresponding to B1 and B2 of FIG. 6.

FIG. 6 is a flowchart illustrating a boot operation of an electronic device according to an embodiment. FIG. 7 is a flowchart illustrating an example of an operation of generating a key storage folder and a key backup folder corresponding to A1 and A2 of FIG. 6. FIG. 8 is a flowchart illustrating an example of an integrity verification operation of a first encryption key corresponding to B1 and B2 of FIG.

Figure 9:
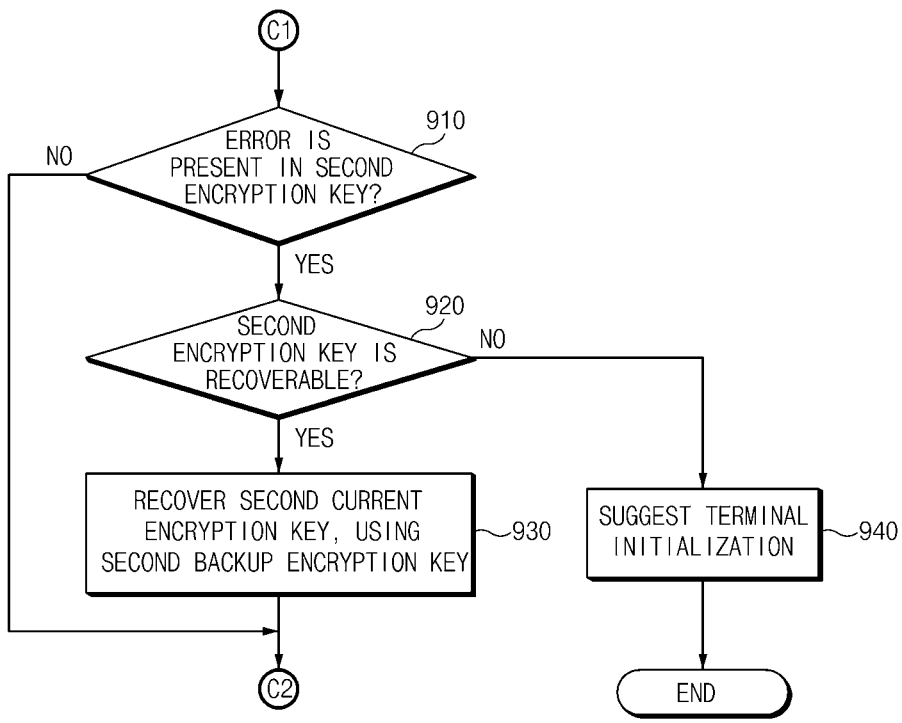
FIG. 9 is a flowchart illustrating an example of an integrity verification operation of a second encryption key corresponding to C1 and C2 of FIG. 6.
Figure 10:
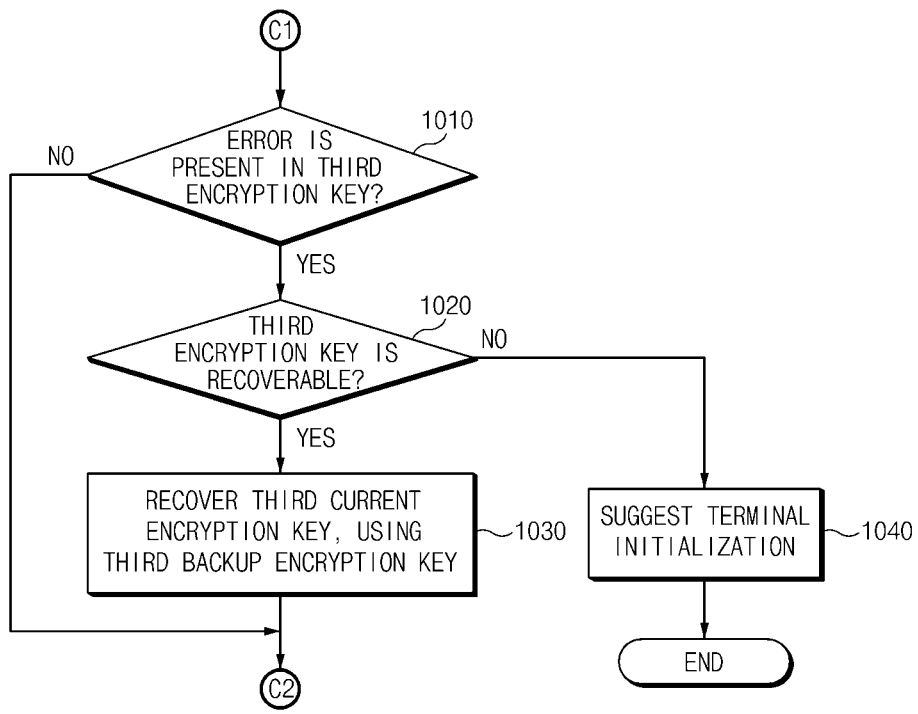
FIG. 10 is a flowchart illustrating an example of an integrity verification operation of a third encryption key corresponding to D1 and D2 of FIG. 6.

6. FIG. 9 is a flowchart illustrating an example of an integrity verification operation of a second encryption key corresponding to C1 and C2 of FIG. 6. FIG. 10 is a flowchart illustrating an example of an integrity verification operation of a third encryption key corresponding to D1 and D2 of FIG. 6.

Referring to FIGS. 6 to 10, at boot time, the processor (e.g., the processor 120) of an electronic device (e.g., the electronic device 101) may verify the integrity of the first to third encryption keys stored in the first to third key storage folders 221, 222, and 223 of FIG. 3 and may perform self-recovery when there is an error in the first to third encryption keys.

According to an embodiment, in operation 605, the processor may mount files stored in the data partition 210 of FIG. 3 at boot time. In operation 610, the processor may determine whether the electronic device is first booted up (e.g., the first use of an electronic device after a user purchases the electronic device or the first boot after the initialization of the electronic device). When a boot is the first boot, after the movement to A1 node, the processor may perform the encryption key generation operation of FIG. 7. When the boot is not the first boot, the processor may perform operation 615.

According to an embodiment, when it is determined in operation 610 that the boot is the first boot, the processor (e.g., the key backup storage unit 240 of FIG. 2B) may perform operation 705 to operation 750 of FIG. 7. Referring to FIG. 7, in operation 705, the processor may generate the first key storage folder 221 in the key storage partition 220 of FIG. 3 and may generate a first encryption key (e.g., the first to third key files 321, 322, and 323 in FIG. 4) corresponding to files (e.g., at least one of the first to fourth data files 311, 312, 313, and 314 in FIG. 4) stored in the first data folder 211 (e.g., global DE) of FIG. 3 to store the first encryption key in the first key storage folder 221. In operation 715, the processor may generate the first key backup folder 231 in the key backup partition 230 of FIG. 3 and may back up (or store) the same first backup encryption key (e.g., the first to third key backup files 331, 332, and 333 in FIG. 4) as the first encryption key, in the first key backup folder 231. In operation 720, the processor may store the first integrity file (e.g., the first integrity file 411 of FIG. 4) obtained by re-encrypting the first encryption key, in the first key backup folder 231. The first integrity file may be generated through the encryption method of FIG. 5A or 5B.

According to an embodiment, in operation 725, the processor may generate the second key storage folder 222 in the key storage partition 220 and may generate a second encryption key corresponding to files stored in the second data folder 212 (e.g., user DE) to store the second encryption key in the second key storage folder 222. In operation 730, the processor may generate the second key backup folder 232 in the key backup partition 230 and may back up (or store) the second backup encryption key, which is the same as the second encryption key, in the second key backup folder 232. In operation 735, the processor may store the second integrity file obtained by re-encrypting the second encryption key, in the second key backup folder 232. The second integrity file may be generated through the encryption method of FIG. 5A or 5B.

According to an embodiment, in operation 740, the processor may generate the third key storage folder 223 in the key storage partition 220 and may generate a third encryption key corresponding to files stored in the third data folder 213 (e.g., user CE) to store the third encryption key in the third key storage folder 223. In operation 745, the processor may generate the third key backup folder 233 in the key backup partition 230 and may back up (or store) the third backup encryption key, which is the same as the third encryption key, in the third key backup folder 233. In operation 750, the processor may store the third integrity file obtained by re-encrypting the third encryption key, in the third key backup folder 233. The third integrity file may be generated through the encryption method of FIG. 5A or 5B. In various embodiments, the third key storage folder 223 may be generated in the sub-folder of the second key storage folder 222. Besides, the third key backup folder 233 may be generated in the sub-folder of the second key backup folder 232.

According to various embodiments, when there are a plurality of users, operation 725 to operation 750 may be repeatedly performed as many as the number of users. After operation 705 to operation 750 may be performed, the processor may perform operation 615 of FIG. 6.

According to an embodiment, in operation 615, the processor may determine whether the files stored in the first data folder 211 are capable of being decrypted. For example, the processor may perform a decryption operation of files stored in the first data folder 211, using a first encryption key stored in the first key storage folder 221. When the files stored in the first data folder 211 are completely decrypted, the processor may perform operation 620. When an error occurs during the decryption operation, after the movement to B1 node, the processor may perform an integrity check operation on the first encryption key in FIG. 8.

According to an embodiment, when an error occurs during the decryption operation on the files stored in the first data folder 211 in operation 615, the processor may perform operation 810 to operation 840 of FIG. 8. Referring to FIG. 8, in operation 810, the processor (e.g., the integrity check unit 250 of FIG. 2B) may determine whether there is an error in the first current encryption key used in operation 615. For example, the processor may calculate the current checksum of the first current encryption key, using the method of FIG. 5A or 5B. The processor may compare the current checksum with the first integrity file 411 pre-stored in the first key backup folder 231. When the current checksum is the same as the first integrity file 411, the processor may determine that there is no error in the first current encryption key and may perform operation 615 of FIG. 6 again after the movement to B2 node. When the current checksum is different from the first integrity file 411, the processor may determine that there is an error in the first current encryption key and may perform operation 820.

According to an embodiment, in operation 820, the processor (e.g., the integrity check unit 250 of FIG. 2B) may determine whether the first current encryption key is recoverable. For example, the processor may calculate the backup checksum of the first backup encryption key stored in the first key backup folder 231, using the method of FIG. 5A or 5B. The processor may compare the backup checksum with the first integrity file 411 stored in the first key backup folder 231. When the backup checksum is the same as the first integrity file 411, the processor may determine that the first current encryption key is recoverable and may perform operation 830. When the backup checksum is different from the first integrity file 411, the processor may determine that the first current encryption key is irrecoverable; in operation 840, the processor may display the content indicating that the electronic device is being initialized, through a display device (e.g., the display device 160).

According to an embodiment, when the backup checksum is the same as the first integrity file 411, in operation 830, the processor (e.g., the key recovery unit 260 of FIG. 2B) may recover the first current encryption key, using the first backup encryption key. For example, the processor may delete the first current encryption key and may store the first backup encryption key in the first key storage folder 221. After the movement to B2 node, the processor may perform operation 615 of FIG. 6 again, using a new first encryption key (e.g., the first backup encryption key).

According to an embodiment, after the first data folder 211 is decrypted in operation 615, the processor may determine whether the files stored in the second data folder 212 are capable of being decrypted. For example, the processor may perform a decryption operation of files stored in the second data folder 212, using a second encryption key stored in the second key storage folder 222. When the files stored in the second data folder 212 are completely decrypted, the processor may perform operation 625. When an error occurs during the decryption operation, after the movement to C1 node, the processor may perform an integrity check operation on the second encryption key in FIG. 9.

According to an embodiment, when an error occurs during the decryption operation on the files stored in the second data folder 212 in operation 620, the processor may perform operation 910 to operation 940 of FIG. 9. Referring to FIG. 9, in operation 910, the processor (e.g., the integrity check unit 250 of FIG. 2B) may determine whether there is an error in the second current encryption key used in operation 620. For example, the processor may calculate the current checksum of the second current encryption key, using the method of FIG. 5A or 5B. The processor may compare the current checksum with the second integrity file pre-stored in the second key backup folder 232. When the current checksum is the same as the second integrity file, the processor may determine that there is no error in the second current encryption key and may perform operation 620 of FIG. 6 again after the movement to C2 node. When the current checksum is different from the second integrity file, the processor may determine that there is an error in the second current encryption key and may perform operation 920.

According to an embodiment, in operation 920, the processor (e.g., the integrity check unit 250 of FIG. 2B) may determine whether the second current encryption key is recoverable. For example, the processor may calculate the backup checksum of the second backup encryption key stored in the second key backup folder 232, using the method of FIG. 5A or 5B. The processor may compare the backup checksum with the second integrity file stored in the second key backup folder 232. When the backup checksum is the same as the second integrity file, the processor may determine that the second current encryption key is recoverable and may perform operation 930. When the backup checksum is different from the second integrity file, the processor may determine that the second current encryption key is irrecoverable; in operation 940, the processor may display the content indicating that the electronic device is being initialized, through a display device (e.g., the display device 160).

According to an embodiment, when the backup checksum is the same as the second integrity file, in operation 930, the processor (e.g., the key recovery unit 260 of FIG. 2B) may recover the second current encryption key, using the second backup encryption key. For example, the processor may delete the second current encryption key and may store the second backup encryption key in the second key storage folder 222. After the movement to C2 node, the processor may perform operation 620 of FIG. 6 again, using a new second encryption key (e.g., the second backup encryption key).

According to an embodiment, after the second data folder 212 is decrypted in operation 620, in operation 625, the processor may display a lock screen (e.g., a numeric password input screen or a pattern input screen) through a display device (e.g., the display device 160). In operation 630, the processor may receive a user password (e.g., a pin or a pattern) and may compare the user password with the user password data stored in the third data folder 213 to unlock the lock screen. To obtain user password data stored in the third data folder 213, in operation 635, the processor may determine whether the third data folder 213 is capable of being decrypted.

According to an embodiment, in operation 635, the processor may determine whether the files stored in the third data folder 213 are capable of being decrypted. For example, the processor may perform a decryption operation of files stored in the third data folder 213, using a third encryption key stored in the third key storage folder 223. When the files stored in the third data folder 213 are completely decrypted, the processor may compare the user password data stored in the third data folder 213 with the user password received in operation 630 to unlock the lock screen and may terminate booting. When an error occurs during the decryption operation, after the movement to D1 node, the processor may perform an integrity check operation on the third encryption key in FIG. 10.

According to an embodiment, when an error occurs during the decryption operation on the files stored in the third data folder 213 in operation 635, the processor may perform operation 1010 to operation 1040 of FIG. 10. Referring to FIG. 10, in operation 1010, the processor (e.g., the integrity check unit 250 of FIG. 2B) may determine whether there is an error in the third current encryption key used in operation 635. For example, the processor may calculate the current checksum of the third current encryption key, using the method of FIG. 5A or 5B. The processor may compare the current checksum with the third integrity file pre-stored in the third key backup folder 233. When the current checksum is the same as the third integrity file, the processor may determine that there is no error in the third current encryption key and may perform operation 635 of FIG. 6 again after the movement to D2 node. When the current checksum is different from the third integrity file, the processor may determine that there is an error in the third current encryption key and may perform operation 1020.

According to an embodiment, in operation 1020, the processor (e.g., the integrity check unit 250 of FIG. 2B) may determine whether the third current encryption key is recoverable. For example, the processor may calculate the backup checksum of the third backup encryption key stored in the third key backup folder 233, using the method of FIG. 5A or 5B. The processor may compare the backup checksum with the third integrity file stored in the third key backup folder 233. When the backup checksum is the same as the third integrity file, the processor may determine that the third current encryption key is recoverable and may perform operation 1030. When the backup checksum is different from the third integrity file, the processor may determine that the third current encryption key is irrecoverable; in operation 1040, the processor may display the content indicating that the electronic device is being initialized, through a display device (e.g., the display device 160).

According to an embodiment, when the backup checksum is the same as the third integrity file, in operation 1030, the processor (e.g., the key recovery unit 260 of FIG. 2B) may recover the third current encryption key, using the third backup encryption key. For example, the processor may delete the third current encryption key and may store the third backup encryption key in the third key storage folder 223. After the movement to D2 node, the processor may perform operation 635 of FIG. 6 again, using a new third encryption key (e.g., the third backup encryption key).

According to various embodiments, when there are a plurality of users, the processor may add an operation of selecting a user before operation 620. In this case, the processor may perform operations 620 to operation 635 on the second data folder 212 and the third data folder 213 corresponding to the selected user.

According to various embodiments, encryption keys, backup encryption keys, or integrity files may be stored in the key storage partition 220 or the key backup partition 230 in advance through at least one of the operations of FIG. 7. In a state where encryption keys, backup encryption keys, or integrity files are stored in a memory (e.g., the memory 130), the processor may separately perform at least one of operations 615 to operation 635 of FIG. 6 during an operation of satisfying a specified condition (e.g., when an error occurs during the decryption of a data folder).

As described above, the processor may determine whether the encryption key is corrupted and recoverable, using an integrity file through the operations of FIG. 8, 9, or 10 and then may perform self-recover on the encryption key, using a backup encryption key. When self-recovery is capable of being normally performed on the encryption key, the data folder may be decrypted normally through the recovered encryption key, thereby preventing the loss of user data.

Figure 11:
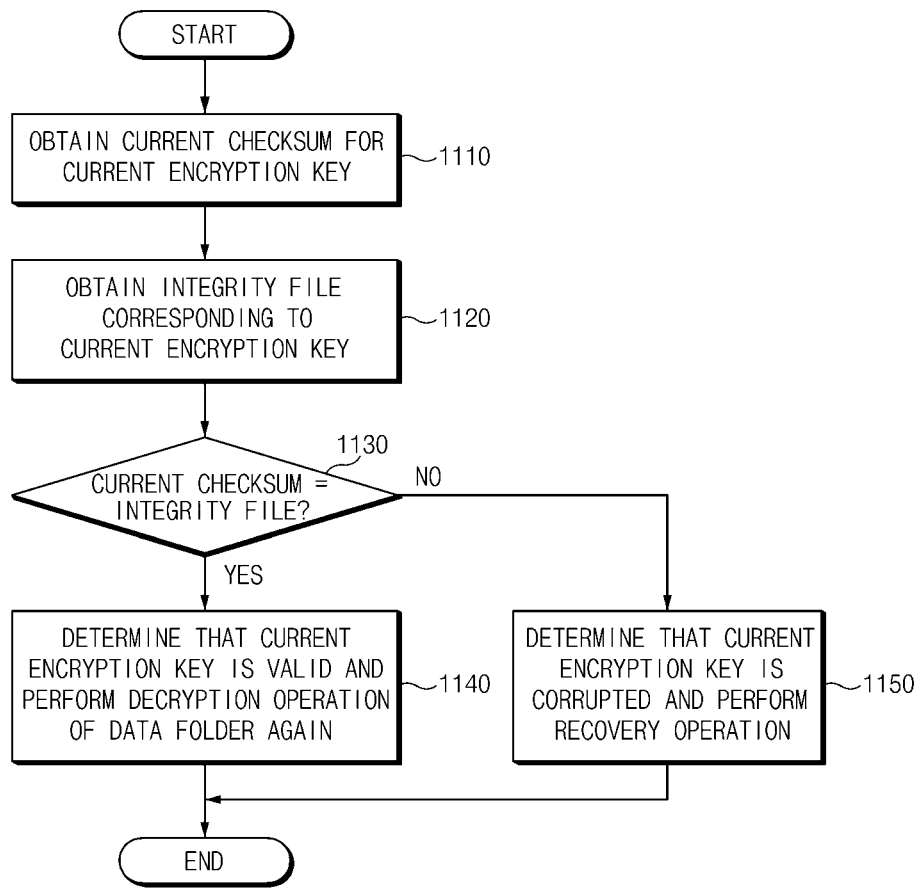
FIG. 11 is a flowchart illustrating a method of determining integrity of a current encryption key of an electronic device according to an embodiment.

FIG. 11 is a flowchart illustrating a method of determining integrity of a current encryption key of an electronic device according to an embodiment. The integrity determining method of FIG. 11 may represent an example of operation 810 of FIG. 8, operation 910 of FIG. 9, or operation 1010 of FIG. 10. Referring to FIG. 11, when an error occurs during the decryption process of the data folder (e.g., one of the first to third data folders 211, 212, and 213) of the data partition 210, the processor (e.g., the processor 120 or the integrity check unit 250) of an electronic device (e.g., the electronic device 101) may perform operation 1110 to operation 1150.

According to an embodiment, in operation 1110, the processor may obtain a current checksum for a current encryption key (e.g., one of first to third encryption keys) corresponding to the data folder. For example, the processor may calculate the current checksum through the method of FIG. 5A or 5B.

According to an embodiment, in operation 1120, the processor may obtain an integrity file corresponding to the current encryption key. For example, when the encryption key corresponding to the data folder is generated, the integrity file may be generated through the method of FIG. 5A or 5B and then may be stored in a key backup folder corresponding to the data folder.

According to an embodiment, in operation 1130, the processor may compare the current checksum with the integrity file. In operation 1140, when the current checksum is the same as the integrity file, the processor may determine that the current encryption key is normal (e.g., the current encryption key remains in the same state as a state in the case where it is generated), and may perform the decryption operation (e.g., operation 615, operation 620, and operation 635 of FIG. 6) of the data folder again. In operation 1150, when the current checksum is different from the integrity file, the processor may determine that the current encryption key is corrupted, and may perform a recovery operation (see FIG. 12) on the current encryption key.

Figure 12:
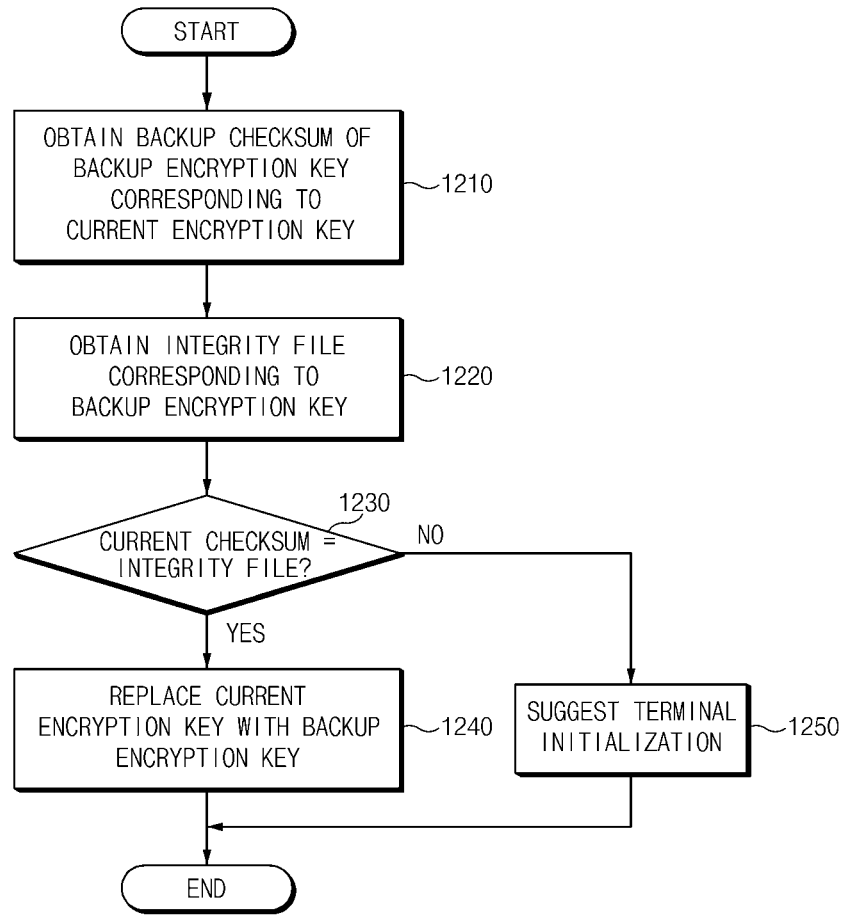
FIG. 12 is a flowchart illustrating a method of determining whether a current encryption key of an electronic device is recoverable, according to an embodiment.

FIG. 12 is a flowchart illustrating a method of determining whether a current encryption key of an electronic device is recoverable, according to an embodiment. A method of determining whether the current encryption key of FIG. 12 is recoverable may represent an example of operation 820 of FIG. 8, operation 920 of FIG. 9, or operation 1020 of FIG. 10. Referring to FIGS. 11 and 12, in operation 1150 of FIG. 11, when it is determined that the current encryption key is corrupted, the processor (e.g., the processor 120 or the integrity check unit 250) of the electronic device (e.g., the electronic device 101) may perform operation 1210 to operation 1250.

According to an embodiment, in operation 1210, the processor may obtain a backup checksum for a backup encryption key (e.g., one of the first to third backup encryption keys) corresponding to the corrupted current encryption key. For example, the processor may calculate the backup checksum through the method of FIG. 5A or 5B.

According to an embodiment, in operation 1220, the processor may obtain an integrity file corresponding to the backup encryption key. For example, when the encryption key corresponding to the data folder is generated, the integrity file may be generated through the method of FIG. 5A or 5B and then may be stored in a key backup folder corresponding to the data folder.

According to an embodiment, in operation 1230, the processor may compare the backup checksum with the integrity file. In operation 1240, when the backup checksum is the same as the integrity file, the processor may determine that the damaged current encryption key is recoverable, and may replace the corrupted current encryption key with the backup encryption key (or may delete the corrupted current encryption key from the key storage folder and may store the backup encryption key in the key storage folder). In operation 1250, when the backup checksum is different from the integrity file, the processor may determine that the current encryption key is irrecoverable, and may display the content indicating the initialization of the electronic device on a display device (e.g., the display device 160). As described above, when self-recovery is capable of being normally performed on the encryption key, the data folder may be decrypted normally through the recovered encryption key, thereby preventing the loss of user data.

Figure 13:
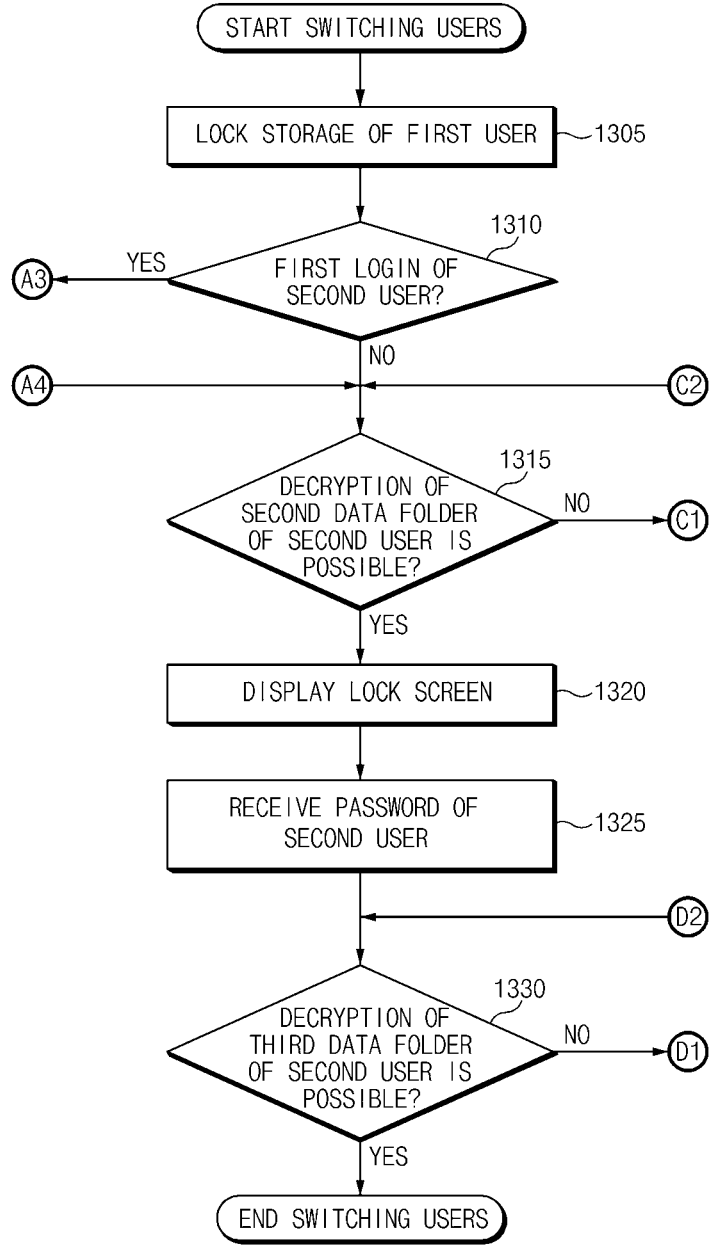
FIG. 13 is a flowchart illustrating a user switching operation of an electronic device according to an embodiment.
Figure 14:
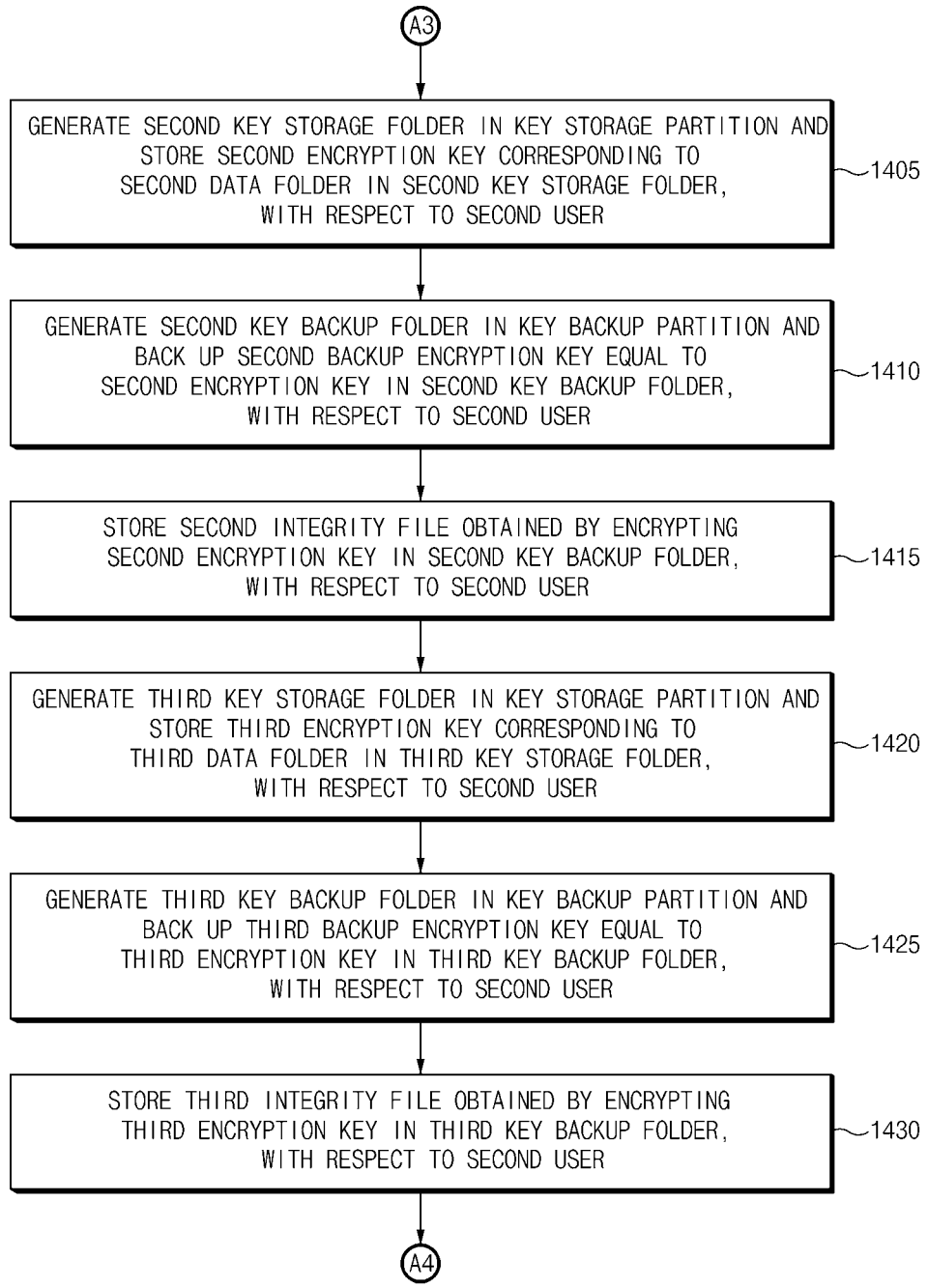
FIG. 14 is a flowchart illustrating an example of an operation of generating a key storage folder and a key backup folder corresponding to A3 and A4 of FIG. 13.

FIG. 13 is a flowchart illustrating a user switching operation of an electronic device according to an embodiment. FIG. 14 is a flowchart illustrating an example of an operation of generating a key storage folder and a key backup folder corresponding to A3 and A4 of FIG. 13.

Referring to FIG. 13, when a user is switched, the processor (e.g., the processor 120) of an electronic device (e.g., the electronic device 101) may verify the integrity of the second and third encryption keys stored in the second and third key storage folders 222 and 223 of FIG. 3 and may perform self-recovery when there is an error in the second and third encryption keys. In FIG. 13, the electronic device may log-out of the first user and may perform log-in of the second user.

According to an embodiment, in operation 1305, the processor may switch the state of the storage (e.g., the second and third data folders 212 and 213 of FIG. 3 corresponding to the first user) of the logged-out first user into a locked state.

According to an embodiment, in operation 1310, the processor may determine whether the login is the first login for the second user. When the login is not the first login of the second user, the processor may perform operation 1315. When the login is the first login of the second user, the processor (e.g., the key backup storage unit 240 in FIG. 2B) may perform operation 1405 to operation 1430 in FIG. 14 after the movement to A3 node.

According to an embodiment, when the login is the first login of the second user, in operation 1405 to operation 1430, the processor may generate the encryption key, the key storage folder, and the key backup folder (e.g., the second key storage folder 222, the third key storage folder 223, the second key backup folder 232, and the third key backup folder 233 of FIG. 3) for the second user. Because operation 1405 to operation 1430 may be the same or similar to operation 725 to operation 750 of FIG. 7, the detailed descriptions of operation 1405 to operation 1430 may be omitted.

According to an embodiment, in operation 1315, the processor (e.g., the integrity check unit 250 or the key recovery unit 260 of FIG. 2B) may determine whether the decryption of the second data folder (e.g., user DE or the second data folder 212 in FIG. 3) of the second user is possible. For example, the processor may perform a decryption operation of files stored in the second data folder of the second user, using the second encryption key of the second user stored in the second key storage folder (e.g., the second key storage folder 222) of the second user. When the files stored in the second data folder of the second user are completely decrypted, the processor may perform operation 1320. When an error occurs during the decryption operation, after the movement to C1 node, the processor may perform an integrity check operation on the second encryption key described in FIG. 9 (see FIG. 9).

According to an embodiment, after the second data folder of the second user is decrypted in operation 1315, in operation 1320, the processor may display a lock screen (e.g., a numeric password input screen or a pattern input screen) through a display device (e.g., the display device 160). In operation 1325, the processor may receive a user password (e.g., a pin or a pattern) for the second user and may unlock the lock screen by comparing the user password with the user password data of the second user stored in the third data folder (e.g., user CE or the third data folder 213 in FIG. 3) of the second user. To obtain the user password data of the second user stored in the third data folder of the second user, in operation 1330, the processor may determine whether the decryption of the third data folder of the second user is possible.

According to an embodiment, in operation 1330, the processor (e.g., the integrity check unit 250 or the key recovery unit 260 of FIG. 2B) may determine whether the decryption of files stored in the third data folder of the second user is possible. For example, the processor may perform a decryption operation of files stored in the third data folder of the second user, using the third encryption key of the second user stored in the third key storage folder (e.g., the third key storage folder 223) of the second user. When the files stored in the third data folder of the second user are completely decrypted, the processor may compare the user password data of the second user stored in the third data folder of the second user with the user password received in operation 1325, may unlock the lock screen, and may terminate user switching. When an error occurs during the decryption operation, after the movement to D1 node, the processor may perform an integrity check operation on the third encryption key in FIG. 10 (see FIG. 10).

According to various embodiments, encryption keys, backup encryption keys, or integrity files may be stored in the key storage partition 220 or the key backup partition 230 in advance through at least one of the operations of FIG. 14. In a state where encryption keys, backup encryption keys, or integrity files are stored in a memory (e.g., the memory 130), the processor may separately perform at least one of operations 1315 to operation 1330 of FIG. 13 during an operation of satisfying a specified condition (e.g., when an error occurs during the decryption of a data folder).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the specification, the loss of the encryption key due to input/output of user data may be prevented by storing encryption keys in a key storage partition different from a data partition.

According to embodiments disclosed in the specification, self-recovery is possible in case of corrupting an encryption key, by backing up encryption keys stored in a key storage partition in a key backup partition.

According to embodiments disclosed in the specification, it is possible to identify the integrity of the encryption keys stored in the key storage partition or the backup encryption keys stored in the key backup partition, using a small-sized integrity file obtained by re-encrypting the encryption keys; besides, it is possible to determine whether the encryption keys are capable of being recovered.

According to embodiments disclosed in the specification, it is possible to decrypt a data folder normally through the backup encryption key when the encryption key is corrupted due to a file system error.

According to embodiments disclosed in the specification, it is possible to normally decrypt the data folder through the backup encryption key when a region where the encryption key of a memory is stored is damaged physically.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a memory in which a region is divided by a data partition, a key storage partition, and a key backup partition; and
a processor operatively connected to the memory,
wherein the processor is configured to:
generate an encryption key with respect to at least one data folder generated in the data partition to store the encryption key in the key storage partition;
store a backup encryption key equal to the encryption key, in the key backup partition; and
store an integrity file including a checksum of the encryption key in the key backup partition,
wherein:
the encryption key includes key files corresponding to the data folder, and
the processor is further configured to:
calculate sub checksums respectively corresponding to the key files;
calculate a main checksum based on a sum of the sub checksums; and
generate the integrity file based on the main checksum.

2. The electronic device of claim 1, wherein the processor is further configured to:
divide the key files into file fragments of a specified size;
calculate sub checksums respectively corresponding to the file fragments;
calculate a main checksum based on a sum of the sub checksums; and
generate the integrity file based on the main checksum.

3. The electronic device of claim 1, wherein the processor is further configured to:
when an error occurs during decryption of the data folder, calculate a current checksum of the encryption key; and
compare the current checksum with the integrity file to determine whether the encryption key is corrupted.

4. The electronic device of claim 3, wherein the processor is further configured to:
when the current checksum is equal to the integrity file, perform the decryption of the data folder again, using the encryption key.

5. The electronic device of claim 3, wherein the processor is further configured to:
when the current checksum is different from the integrity file, calculate a backup checksum of the backup encryption key; and
compare the backup checksum with the integrity file to determine whether the encryption key is recoverable.

6. The electronic device of claim 5, wherein the processor is further configured to:
when the backup checksum is equal to the integrity file, recover the encryption key, using the backup encryption key.

7. The electronic device of claim 6, wherein the processor is further configured to:
when the backup checksum is different from the integrity file, determine that the encryption key is not recoverable; and
output a guidance of terminal initialization.

8. An electronic device comprising:
a memory in which a region is divided by a data partition, a key storage partition, and a key backup partition; and
a processor operatively connected to the memory,
wherein the data partition includes:
a first data folder in which files associated with driving of the electronic device are stored; and
a second data folder in which files associated with a user are stored, and wherein the processor is configured to:
at a first boot time, generate a first encryption key corresponding to the first data folder to store the first encryption key in a first key storage folder of the key storage partition,
store a first integrity file including a first checksum calculated based on the first encryption key, in a first key backup folder of the key backup partition,
at the first boot time or when users are switched, generate a second encryption key corresponding to the second data folder to store the second encryption key in a second key storage folder of the key storage partition, and
store a second integrity file including a second checksum calculated based on the second encryption key, in a second key backup folder of the key backup partition.

9. The electronic device of claim 8, wherein the processor is further configured to:
at the first boot time, store a first backup encryption key equal to the first encryption key in the first key backup folder; and
at the first boot time or when the users are switched, store a second backup encryption key equal to the second encryption key in the second key backup folder.

10. The electronic device of claim 9, wherein the processor is further configured to:
when an error occurs upon decrypting the first data folder, calculate a first current checksum of the first encryption key; and
compare the first current checksum with the first integrity file.

11. The electronic device of claim 10, wherein the processor is further configured to:
when the first current checksum is equal to the first integrity file, perform a decryption operation of the first data folder again, using the first encryption key.

12. The electronic device of claim 11, wherein the processor is further configured to:
when the first current checksum is different from the first integrity file, calculate a first backup checksum of the first backup encryption key; and
compare the first backup checksum with the first integrity file.

13. The electronic device of claim 12, wherein the processor is further configured to:
when the first backup checksum is equal to the first integrity file, delete the first encryption key from the first key storage folder; and
store the first backup encryption key in the first key storage folder.

14. The electronic device of claim 9, wherein:
the data partition includes a third data folder in which files associated with a user password are stored, and
the processor is further configured to:
at the first boot time or when the users are switched, generate a third encryption key corresponding to the third data folder to store the third encryption key in a third key storage folder of the key storage partition; and
store a third backup encryption key equal to the third encryption key in a third key backup folder; and
store a third integrity file including a third checksum calculated based on the third encryption key, in the third key backup folder of the key backup partition.

15. The electronic device of claim 14, wherein the processor is further configured to:
after a decryption operation of the first data folder and the second data folder, display a lock screen on a display; and
receive the user password through an input device.

16. The electronic device of claim 15, wherein the processor is further configured to:
when an error occurs upon decrypting the third data folder, calculate a third current checksum of the third encryption key; and
compare the third current checksum with the third integrity file.

17. The electronic device of claim 16, wherein the processor is further configured to:
when the third current checksum is different from the third integrity file, calculate a third backup checksum of the third backup encryption key; and
compare the third backup checksum with the third integrity file.

18. The electronic device of claim 17, wherein the processor is further configured to:
when the third backup checksum is equal to the third integrity file, delete the third encryption key from the third key storage folder; and
store the third backup encryption key in the third key storage folder.

19. The electronic device of claim 18, wherein the processor is further configured to:
decrypt the third data folder, using the third backup encryption key; and
determine whether to unlock the first data folder, the second data folder, and the third data folder, based on a comparison result of the user password received through the input device and the user password stored in the third data folder.

* * * * *